Figure 1:
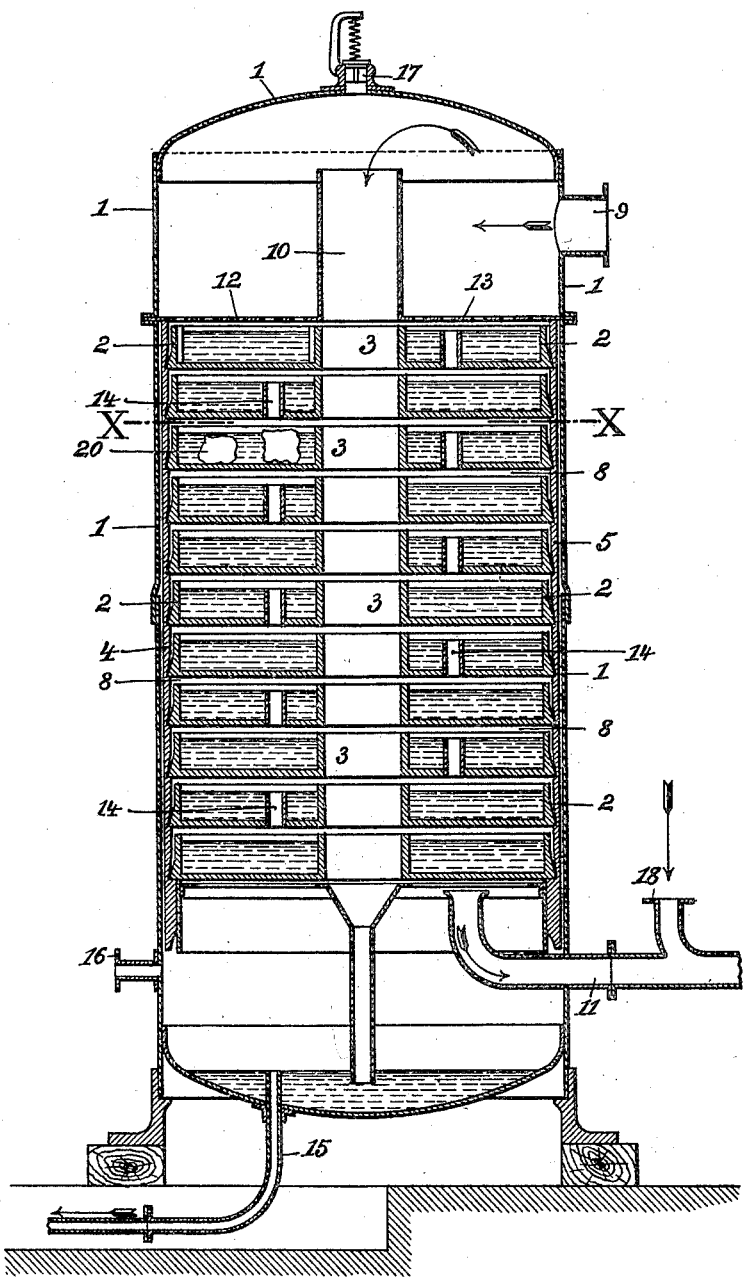

No. 679,242. Patented July 23, 1901.
A. C. E. RATEAU.
STEAM REGENERATIVE ACCUMULATOR.
(Application filed Apr. 12, 1901.)
(No Model.)
2 Sheets—Sheet 2.

UNITED STATES PATENT OFFICE.

AUGUSTE CAMILLE EDMOND RATEAU, OF PARIS, FRANCE.

STEAM-REGENERATIVE ACCUMULATOR.

SPECIFICATION forming part of Letters Patent No. 679,242, dated July 23, 1901.

Application filed April 12, 1901. Serial No. 55,456. (No model.)

*To all whom it may concern:*

Be it known that I, AUGUSTE CAMILLE EDMOND RATEAU, a citizen of the Republic of France, residing at Paris, France, have invented certain new and useful Improvements in Steam - Regenerative Accumulators, of which the following is a specification.

The apparatus which forms the object of the present invention is intended to receive the exhaust of mining - engines, reversible rolling-machines, and in general of any machine worked by steam having an intermittent action.

It is impossible in the present state of the art to utilize intermittently-delivered steam in an auxiliary engine provided with a condenser and connected intermittently with the main engine. The difficulty in using condensers in this class of engine by reason of the irregularity of the exhaust is known.

The apparatus which I interpose between an engine having an intermittent exhaust and an auxiliary engine intended to utilize the steam, or, again, between an engine having an intermittent exhaust and its condenser, has for its object the storage of the steam. It has the function of an accumulating-reservoir. An ordinary simple reservoir would have to be of enormous dimensions. I obviate this difficulty by condensing the steam by contact with a mass of material, forming an equalizer of heat when it arrives in great quantities and revaporizing it again when steam is no longer delivered from the main engine. This result is obtained owing to small fluctuations of pressure in the accumulator—fluctuations which correspond to the variations in temperature.

If $t$ is the variation in temperature, which in practice in this apparatus is from 3° to 5° centigrade, P the weight of the mass of the materials forming the equalizer of heat, G the average specific heat of these materials, the quantity of heat stored by the accumulator and restored by it at each period is equal to $P G t$ calories, and these $P G t$ calories correspond to a weight of steam condensed and then vaporized equal to about $\frac{P G t}{L}$, L being the latent heat of vaporization of water.

The auxiliary low-pressure engine, placed after the main engine, may be a piston-engine; but it is preferably a steam-turbine, this being capable of better and more completely utilizing the expansion of the low-pressure steam and also being less costly of installation and maintenance.

By the use of steam-turbines the benefit that can be extracted from the use of the apparatus is considerable, for there would be about two horse-power at the auxiliary engine per horse-power indicated in the main engine.

The apparatus forming the object of the present invention is shown in the annexed drawings, in which—

Figure 3:
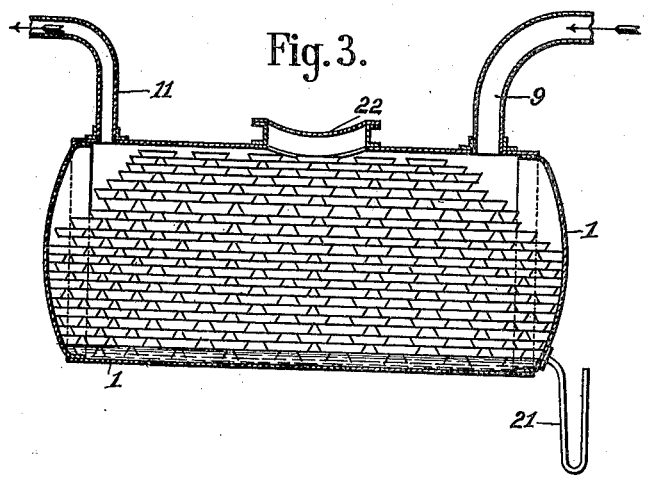
Figure 2:
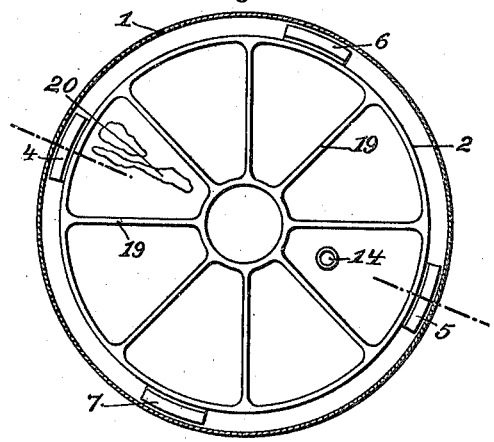

Figure 1 is a vertical section; Fig. 2, a horizontal section on the line X X of Fig. 1. Fig. 3 is a longitudinal sectional view of a modification of the apparatus.

Referring to the drawings, 1 is a preferably cylindrical vessel of sheet-iron arranged vertically, as in Fig. 1, or horizontally, as in Fig. 3. In the vessel shown in Figs. 1 and 2 metal trays 2, of sheet or cast iron, are piled one above the other. These trays are of annular shape and are provided with a central hole 3. The trays, although placed one above the other, do not, however, touch, for they are provided with projections which rest upon racks 4, 5, 6, and 7. The spaces 8 between the trays give passage to the steam. The steam which enters the apparatus through the pipe 9 passes to the trays through the central passage 10. The uncondensed steam and the revaporized steam pass downward along the lateral walls of the vessel 1 and pass out through the outlet-pipe 11, which leads it either to an auxiliary low-pressure engine or to an ordinary condenser. The liquid drawn along by the steam separates in the upper chamber and falls from tray to tray, first through the holes 12, formed in the plate 13, thence through the overflow - pipe 14, with which all the trays are provided, to the bottom of the vessel, from whence it passes out through the pipe 15, which conducts it to an automatic steam-trap, or, again, to any auxiliary boiler. In this latter case the resulting steam reënters the apparatus through the pipe 16.

When the regenerating-accumulators feed an engine, it is preferable to make arrangements for rendering the working of this engine independent of that of the main engine, which delivers steam to the regenerative-accumulator. For this object a valve 17 is provided, which prevents too high a pressure in the apparatus, and also a pipe 18, which allows steam to pass in from the main boilers when the pressure falls below a certain limit. This arrangement is desirable for the following reasons: first, to give a very large surface for the condensation and recuperation of the steam, and, second, to allow a relatively large mass of metal and liquid to be inclosed in a small space. This mass, which plays the part of an equalizer of heat, should be greater when there is more steam to accumulate and as less irregularity in the pressure of the outcoming steam is desired. It may be increased by arranging ribs 19, Fig. 2, upon the bottoms of the trays and by placing in the trays pieces 20 of scrap-iron, cast-iron, or of any material, Figs. 1 and 2.

In a modified form of apparatus illustrated in Fig. 3 the trays are omitted, and the apparatus consists of any heat-retaining materials, or materials which are good conductors of heat, piled up in a horizontal or vertical vessel. One would lose, it is true, the benefit of the water in the trays of the apparatus shown in Figs. 1 and 2 as an equalizer of heat. In this modified form of apparatus, 1 is a sheet-iron vessel arranged horizontally or preferably slightly inclined in order to aid the flow of water through the siphon 21. 22 is a manhole allowing the materials piled in the vessel to be put in or withdrawn. The steam passes in through the pipe 9 in an intermittent manner and passes up through the pipe 11 in a constant stream.

Having thus described the nature and objects of my invention, what I claim as new, and desire to secure by Letters Patent, is—

1. In a steam-regenerative accumulator for engines having an intermittent exhaust, a vessel having an inlet for the exhaust and an outlet for the regenerated steam and a series of superposed heat-retaining bodies located within the vessel between the inlet and outlet openings thereof, said bodies being arranged so that their surfaces are opposed to the passage of the steam through the vessel, substantially as and for the purposes described.

2. In a steam-regenerative accumulator of the character described, a cylindrical vessel arranged in an upright position, a series of superposed trays located within the vessel and separated from each other and the internal walls of the vessel, an inlet for the steam arranged so that the steam is adapted to traverse the entire surface of each tray and an outlet for the regenerated steam located below said trays, substantially as and for the purposes described.

3. In a steam-regenerative accumulator of the character described, a vessel having an exhaust-inlet leading from the intermittently-acting engine, said vessel interposed between the same and the condenser or auxiliary low-pressure engine, a series of superposed heat-retaining bodies located within the vessel and having their surfaces opposed to the passage of the exhaust-steam through said vessel, a safety-valve connected with said vessel, an automatic steam-trap adapted to collect the liquid condensation in the vessel, an outlet-pipe leading the regenerated steam to the point of use and a pipe leading auxiliary steam to said outlet-pipe, substantially as and for the purposes described.

In testimony whereof I have signed this specification in the presence of two subscribing witnesses.

AUGUSTE CAMILLE EDMOND RATEAU.

Witnesses:
PAUL DE MESTRAL,
EDWARD P. MACLEAN.